United States Patent

Wyckoff

[11] 4,069,787
[45] Jan. 24, 1978

[54] DIRECTION-INDICATING SURFACE MARKER AND THE LIKE

[76] Inventor: Charles W. Wyckoff, 85 Pine St., Needham, Mass. 02192

[21] Appl. No.: 567,262

[22] Filed: Apr. 11, 1975

[51] Int. Cl.$^2$ .......................... E01F 9/04; G02B 5/126
[52] U.S. Cl. ................................. 116/63 R; 350/104; 404/14; 427/137
[58] Field of Search .............. 116/63 R; 350/104–106; 40/130 A, 130 J, 130 B; 404/14, 16, 12; 427/137

[56] References Cited

U.S. PATENT DOCUMENTS

| | | | |
|---|---|---|---|
| 2,232,023 | 2/1941 | Flocks | 404/14 |
| 2,251,386 | 8/1941 | White | 40/130 J |
| 2,543,800 | 3/1951 | Palmquist et al. | 404/16 |
| 3,292,507 | 12/1966 | Vanstrum | 350/105 |
| 3,404,610 | 10/1968 | Hischmann | 404/14 |
| 3,827,783 | 8/1974 | Lemelson | 350/104 |

*Primary Examiner*—Richard C. Queisser
*Assistant Examiner*—Daniel M. Yasich
*Attorney, Agent, or Firm*—Rines and Rines, Shapiro and Shapiro

[57] ABSTRACT

A distinctively and unambiguously marking of the directions of travel on motoring highways, airports and other surfaces with the aid of a thin novel saw-tooth marker strip that is adhered to the traveling surface and has distinctively colored successive surfaces of retroreflecting materials, including transverse cylindrical refractive elements embedded between wedges in the thin strip.

2 Claims, 1 Drawing Figure

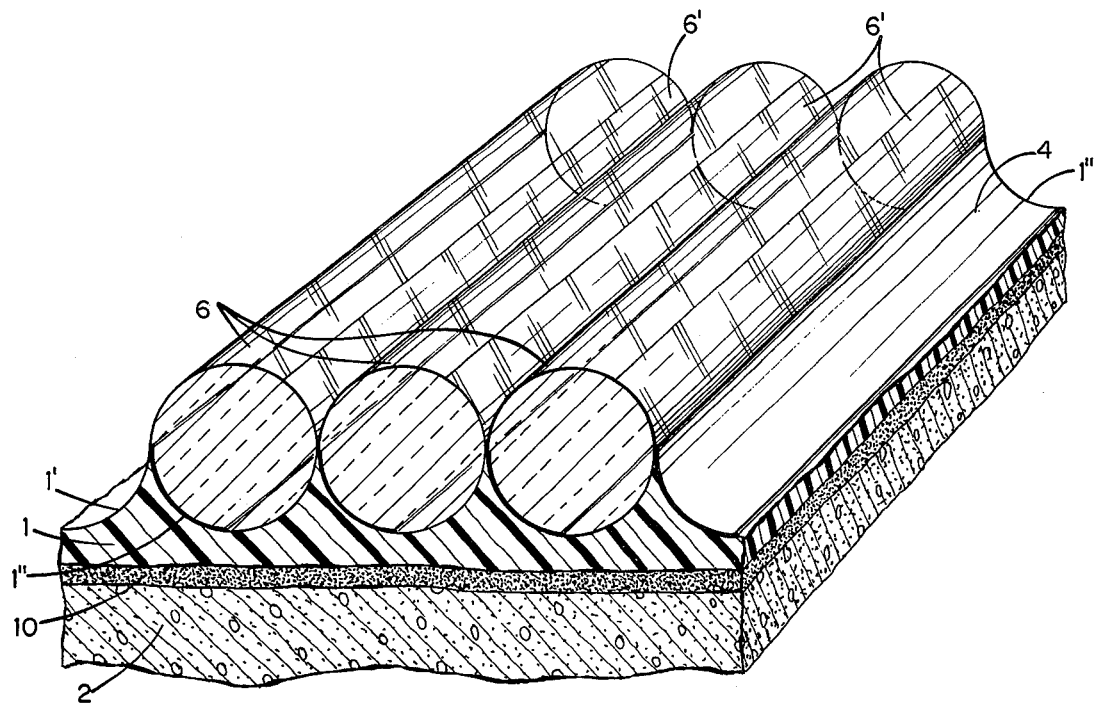

DIRECTION-INDICATING SURFACE MARKER AND THE LIKE

The present invention relates to apparatus for direction-indicating surface marking and the like, being more particularly concerned, for example, with marking highway surfaces in such a manner that the mark will visually indicate to a motorist in a distinctive color, such as red, that he is proceeding in an improper direction of travel. Clearly, similar applications exist in airport runway surfaces and on other surfaces, as well, for the same or similar purposes and functions. Accordingly, the term "surface" will be used hereinafter in a general sense, as will the words "horizontal" and "vertical" be used sometimes in connection with orientation of the parts in an illustrative and relative and thus a generic sense, also, since the invention is applicable in many geometric configurations. The term "color" is also used herein in a broad sense to embrace both spectral wavelengths and different shades or hues that provide different surface appearances.

The serious problem has long existed in all major highways of the world of alerting motorists to instant recognition of an improper direction of travel as they proceed along the highway. All too often, an unsuspecting motorist proceeds in the wrong direction of travel and heads directly into opposing traffic. This is a surprisingly common occurrence on divided highways, particularly when the lanes are separated by some distance between them. In such instances, even under ideal weather and visibility conditions, each lane appears to the motorist to be a separate highway without clues to indicate whether it is a two-directional traffic road or a single direction highway. Nor is there any clue indicating either the proper or improper flow of traffic. Initial road signs and other devices that have been in use have proven far from fool-proof.

Recognition of the wrong way to proceed, whether immediate or not, is often exceedingly difficult and sometimes impossible for the motorist to decide. For example, during heavy rain or dense fog, and especially at night, the ensuing confusion has led to many fatal accidents or head-on collisions.

Many dual-lane divided highway motoring surfaces, moreover, have delineator posts positioned along the side of the roadbed every few hundred feet. These delineators usually contain a highly reflective material at their tips so that, at night, with headlight illumination, they may serve visually to indicate the edge of the road. The highly reflective optical material generally used is known as a "retroreflector"; that is, a material which returns nearly all of the incident light back along the same direction from whence it came. These reflectors can be of geometric forms such as a plurality or series of small members such as cubes, pyramids, Fresnel reflectors, or tiny transparent glass or plastic rods, fibers or spheres secured to a light-colored diffusely reflecting surface. The latter is the basis of a commercially available product marketed, for example, by Minnesota Mining and Manufacturing Company, under the trademark "Scotchlite", and incorporated into many highly reflective street signs, stop signs, and other highway visual warning signs, as disclosed, for example, in U.S. Pat. No. 2,407,680. This optical material has also been incorporated with a paint base which may be applied to many surfaces, such as roadways, either by a spray or brush technique, as described, for example, in U.S. Pat. No. 2,824,502.

All of these optical materials are highly efficient retroreflectors at a normal angle of incidence, and so return a large percentage of the incident light back upon itself. As the angle of incidence becomes more oblique, however, these materials become less efficient in the percentage of light they return as retroreflectors. When applied to the surface of a highway to serve as a visual marker, such as a traffic lane divider, as for example, in U.S. Pat. No. 2,440,584, such optical materials are thus only slightly better than ordinary paint, especially when observed by automobile headlights at night, and have not served adequately to solve the above-mentioned problem. Furthermore, their visual appearance is the same when viewed from all directions and thus they do not provide direction discrimination.

The reflected light may be made to appear in a given color by proper selection of reflecting material or binder in which the optical reflecting elements are embedded. For example, if the background is white, then the retroreflected light will be white. If the optical elements are disposed on a green background, the reflected light will be green. Likewise a red appearance will result from embedding the optical elements in a red binder or background.

It should be obvious, however, that if a red background has been selected, the appearance of the reflected light will always be red irrespective of the viewing angle. Thus, a road stripe using a red background material in which the optical elements are contained, will always have a red appearance regardless of the viewing angle. This fact has thus precluded use of such a material per se to serve the purposes of a visual highway wrong-direction traffic color indicator in view of its same color appearance from all angles of view.

While it has been proposed to make highways more illuminable, as by constructing roadway surfaces with blocks that would impart a saw-toothed roadway configuration, as in U.S. Pat. No. 2,330,808, thus to reflect light incident upon the road surface from headlights more generally back toward the vehicle to render the road surface more visible, this does not provide unambiguous discrimination of direction of reflection, it inherently produces road chatter and vibration, and, indeed, it is exorbitantly expensive and not adaptable to be employed in existing roadways and the like. Similarly, the concept of using lenses to improve visibility, even with retroreflective materials, as in U.S. Pat. No. 3,292,507, is subject to similar road chatter, non-universal adaptability for application, and expense disadvantages, among others. Similar disadvantages reside in the use of various-shaped blocks with retroreflective materials, as in U.S. Pat. Nos. 2,579,467 and 3,418,896. Other proposals for improved visibility and marking have been made as in U.S. Pat. Nos. 1,740,501; 1,850,370; 1,981,206; 2,232,023; 2,256,636; 3,103,859; 3,252,376; 3,291,011; 3,355,999; 3,499,371; 3,529,517; and 3,575,773; but, again, these all lack either the discrimination or other practical features before-discussed that underlie the problem of the present invention.

In copending application Ser. No. 478,453, filed 6/12/74 for Method of and Apparatus for Direction-Indicating Surface Marking and The Like, now abandoned in favor of a continuation application, Ser. No. 649,267, filed Jan. 15, 1976, there is disclosed the discovery that through the use of a novel thin saw-toothed strip combined with critically positioned distinctively colored retroreflective material on one set of parallel wedge surfaces of a thin strip, and sometimes optically diffuse and sometimes retroreflective differently colored reflecting surfaces therebetween, all of the above-described disadvantages of prior markers are admirably overcome; and, indeed, the retroreflector is not subject, in its novel orientation therein, to its customary lack of angular discrimination, before discussed, in prior art uses of the same and requires no special lenses or the like as in said U.S. Pat. No. 3,292,507. A synergistic combination effect is produced by employing a direction-indicating surface marker apparatus comprising a thin substantially planar strip to be adhered to a roadway or the like, and having successive contiguous wedges of saw-tooth cross-sectional configuration at least the downwardly inclining surfaces of which wedges are integrally covered by retroreflective means and presenting a predetermined color. The upwardly inclining surfaces may be differently colored and of optically diffuse or also retroreflective properties.

While the illustrative examples of said copending application show the retroreflection achieved by an array of retroreflective beads applied to the wedge surfaces, there are occasions where it may be desired to employ refractive fibers or cylinders in the structures. Indeed, a highly effective and more economical construction has been found to be achieved by embedding between the wedges upon their surfaces, transverse cylindrical refractive elements, in a novel and highly effective manner.

An optical fiber or cylinder, in cross-section, performs the same light refractive function as a sphere in cross-section. Light refraction in a complete optical sphere however, results in formation of a point image; whereas in a cylinder, an elongated line image is produced with a direction parallel to the longitudinal axis of the cylinder. A prime function for a highway direction indicator is production of a visual signal sufficiently extended in dimensions of both length and width so as to be easily observed by the operator of a motor vehicle proceeding along the highway. The point source reflection from a single optical sphere is therefore difficult to see and has proven unsatisfactory. In order for the reflection to become readily apparent, many optical spheres must be crowded together thus giving the appearance of extended dimensions. A single optical cylinder, on the other hand, produces a readily visible extended line reflection in one dimension whose length is controlled by the length of the cylinder. Apparent extension of the other dimension must be accomplished, in similar manner to the optical spheres, by arranging one optical element to be in close optical angular relation to another, such as by placing one such element immediately adjacent to another. When viewed obliquely by an observer, one element would thus appear to be behind the other and the angular separation would depend upon the distance between them. The angular separation for the highway direction indicator is thus dictated by the spacing of the wedges upon whose surface the optical retroreflective elements are attached, as well as the oblique viewing angle of the observer. Thus, since optical cylinders produce retroreflections continuous in at least one dimension, for the purposes of the present invention, they are preferred.

An additional reason for cylinder preference is, of course, the greater simplicity permitted in construction. The binder necessary to hold the optical elements securely in position must completely encompass the spheres at their equator whereas it need only grip the cylinders along the two edges at the equator, thus resulting in a simpler construction.

An object of the present invention, accordingly, is to provide a new and improved apparatus for direction-indicating surface marking, as for such purposes as visually warning motorists when they are proceeding in an improper direction, and for other applications, employing such cylindrical refractive fibers, rods or similar elements, while still using a thin planar strip universally attachable to roadbeds and the like.

A further object is to provide such a novel apparatus employing, in a critical manner, cylindrical retroreflective materials such as to cause a distinct color or hue to be observed over a wide range of distances when observed from one direction, and a totally different color or color appearance, such as none at all, when viewed from any other direction.

Another object of the invention is to provide a more efficient retroreflector for use at very oblique angles.

A further object of the invention is to provide landing strips or airport runway markers which will delineate the edges of such runways to the operators of aircraft using these facilities.

Other and further objects will appear hereinafter and are more particularly delineated in the appended claims.

In summary, the invention in one of its aspects, contemplates a direction-indication surface marker having, in combination, a thin substantially planar strip adapted to be secured to a roadway and having successive contiguous wedges of saw-tooth cross-sectional configuration, each wedge having one surface inclining upwardly and its other surface inclining downwardly; at least one of said surfaces being integrally convered by retroreflective means comprising refractive cylinder means extending transversely of said strip in the space between said downwardly and upwardly inclining surfaces of successive wedges.

In further summary, in one embodiment, a visual warning system would comprise and optical retroreflecting material which would appear as a red color when observed from one direction and a distinctly different color or hue when observed from another direction. In another embodiment, the optical material would be highly retroreflective when observed from a given direction but would have little if any reflection and thus have a different color appearance when viewed from any other direction.

This optical material is preferably secured to the surface of a paved highway or runway in the form of circles, squares, arrows, letters, solid unbroken lines, or dashed lines in much the same way that paint is applied to surfaces.

The invention will now be described with reference to the accompanying drawings, the single FIGURE of which is a fragmentary isometric view, upon a much enlarged scale, of a preferred embodiment applied to a marker strip or the like on a highway or similar surface.

The marker strip 1 of the invention is shown for illustrative purposes as comprising a corrugated, zig-zag or cross-sectionally saw-toothed configuration 1-1'-1" upwardly extending from the thin flat strip base, preferably formed into successive contiguous in-line wedges. The thin strip, unlike prior art blocks, lens devices and the like, is adapted for facile and universal attachment to road and other surfaces 2 by thin adhesive coatings 10 of thermalsetting cements, such as a mixture of rubber hydrochloride and "Glyptal"

7424(General Electric) or "Duraplex" D-65-A (Rohm and Haas), and other similar well-known adhesives.

In this embodiment, each wedge has a surface 1' inclining upwardly at an acute angle to the horizontal, such as the roadway surface 2, and a surface 1" inclining downwardly, substantially also making an acute angle with the horizontal and presenting a nearly vertical orientation, particularly at the upper regions thereof.

While glass beads have been embedded as sheets to enable retroreflection, as before discussed and as shown in U.S. Pat. Nos. 2,407,680, 2,440,584, 2,592,882, and 3,043,196, as other examples, in accordance with the present invention they may be used to fill or partially fill the spaces between adjacent downwardly inclining and upwardly inclining surfaces of successive corrugated or saw-tooth integral wedges 1'-1" of the thin planar strip 1 in order to perform the improved function of this invention.

Thus, in the drawing, the saw-tooth wedges or corrugations 1'-1", preferably integrally formed from the material of the thin planar strip 1, instead of having sheeet-like retroreflective layers upon their inclined surfaces, may mount a single (or multiple) larger optically refracting cylindrical or other refractive element 6. The cylindrical elements 6 may indeed be embedded transversely in the row spaces between downwardly and upwardly inclining wedge surface 1" and 1' of the successive wedges of the substantially planar strip 1 to provide an integral structure. By providing a highly reflective surface, such as shown at 4 on the downwardly inclining surface 1", retroflection may be achieved as the refractive cylinder 6 directs the incident light upon the reflective surface 4.

The wedge material itself may also be rendered reflective by incorporating aluminum flakes so that the integral combination of the wedge surfaces and the refractive cylindrical elements 6 constitute the retroreflector.

The saw-tooth or corrugated wedges 1'-1" may be substantially triangular at their upper edges or vertices, as shown, and the cylinders 6 may be sufficiently large to fill the space between successive wedges and thus be substantially contiguous and to extend preferably almost half above the wedges of the strip 1. Transparent color dye or the like 6' is shown provided in the upper forward quadrant of each cylinder surface 6 to provide, for example, a transparent red indication. Alternatively, the integral strip wedges 1'-1" may be further successively spaced longitudinally than shown; and the refractive cylinders 6 embedded on the wedge reflective surfaces may be uniformly or irregularly spaced to provide the desired uniform or nonuniform retroreflective striped effects in response to incident light retroreflected from the assembly, only partly filling the space between wedges.

In all cases, the thin substantially planar strip assembly 1-1'-1"-6 is readily applied by adhesive 10 to any horizontal roadbed or other surface 2 (horizontally, vertically or otherwise oriented) to provide a longlasting highly effective retroreflector direction indicator or other marker responsive to incident light beams.

By transparently coloring the retroreflecting elements 6 themselves, say red, as with an appropriate fluorescent or other dye 6', or a transparent color filter, the motorist approaching from the wrong direction will selectively and directionally see reflected red warning continuous stripes along a longitudinal line both in daylight and under the action of the motorist's headlights and over a large range of distances.

Underlying the efficacy of the invention, is the following phenomenon, among others above explained. While diffuse surfaces, such as white paper, appear to be bright when close to a light source, with the decrease in apparent brightness with distance following the well-known inverse square law, in the case of the retroreflecting surfaces 6-4, however, the distance between the point light source and the retroreflector makes very little difference upon the apparent brightness. Those surfaces at great distances appear to be nearly as bright as those nearest the light source, with surface reflection losses preventing the result from remaining at 100% level.

In view of this phenomenon and the critical geometric and other constructional arrangements of the invention, highly effective wrong-way indicators may be constructed and used as before suggested or even as side-of-the-road or other markers, with the wedges mounted on posts, crash rails or other surfaces in the vertical plane.

In practice, the thin strips 1-1'-1"-6 suitable for highway, airport or related uses may be formed in various ways. A preferred way of making the illustrated structure and preferred materials will now be set forth.

Overcoat a 4-inch-wide Kraft paper carrier web with a layer of a temporary bonding material such as a nonhardening plasticized resin as disclosed, for example, in U.S. Pat. No. 2,963,378. Other suitable bonding materials include polyethylene which when heated becomes tacky, as disclosed in U.S. Pat. No. 3,190,178; or a naptha base rubber solution such as Carter's Rubber Cement No. 845. Transparent hard glass fibers or cylinders 4 inches long and having a diameter range of approximately 1 to 20 mils and a refractive index of at least 1.9 are then applied to the surface of the temporary binder by passing the coated web through a trough of said cylinders where they will be picked up and adhered to the tacky surface and thus form a monolayer of substantially contiguous and parallel cylinders. The web is then heated or passed between rollers which cause the cylinders to be firmly embedded in the surface of the temporary binder layer.

The carrier web, cylinder side down, is then passed into a high vacuum chamber where a deposition of metallic aluminum is applied to the exposed surface of the cylinders. Metallic aluminum vapor, generated by heating a source of aluminum, such as Cryolite (sodium aluminum fluoride) disposed beneath the web carrying the cylinders, then condenses on the cooler walls of the cylinders and forms a reflective coating 4 thereon. The web, cylinder side up, next enters a chamber at 0°–5° C, and a roller applicator coats a viscous layer of a 20–40% solution of methylene chloride and a polycarbonate of the type disclosed, for example, in U.S. Pat. No. 2,950,266 onto the cylinders. This viscous liquid polycarbonate layer covers the aluminum coated cylinders and fills the interstices there-between and forms a substantially smooth outer surface.

Approximately 30 minutes is required to allow the cast polycarbonate to set when chilled air is directed over the surface. The web of cast material is then passed into another chamber of fast moving air at 15°–25° C where the cast polycarbonate is further dried for about a half hour and then stripped from the carrier web at an elevated temperature of about 100° C to facilitate stripping. The cast polycarbonate strip is then allowed to dry for an additional hour at 15-25 °C. If the temporary binder is rubber cement, it will be necessary to immerse the strip in a bath of naptha in order to remove the excess cement. A transparent colored filter layer 6' is then applied to one quadrant of the cylinder walls in order to provide the color differentiation, with the resulting integral thin marker strip 1-1'-1"-6 being preferably of the order of from a few mils to a few tens of mils in thickness.

While the invention has been described in connection with the near-vertical preferred substantially parallel successive wedge surfaces 1' and 1" for the reasons explained, it has been found that satisfactory operation may be obtained for deviations of the angle with respect to the vertical of the surfaces 1" up to, but preferably not exceeding, about 45°. In some instances, moreover, the type of contrast between retroreflection at 6'-4-1" and diffuse reflection at 1" may not be necessary; and, indeed, retroreflection may be desired on both sets of wedge surfaces, as in highway lane dividers or airport landing strips. Color differentiation of sets of wedge surfaces might then not be necessary.

Further techniques for forming, and other modifications of construction will suggest themselves to those skilled in this art and are considered to fall within the spirit and scope of the invention as defined in the appended claims.

What is claimed is:

1. A direction-indication surface marker having, in combination with a road surface, a thin substantially planar self-sustaining strip of plastic material secured to said road surface by adhesive and sufficiently flexible to permit the strip to conform to the road surface, said strip having successive contiguous transverse wedges of saw-tooth cross-sectional configuration throughout the strip, each wedge having one surface inclining upwardly and its other surface inclining downwardly; at least one surface of each wedge upon which light impinges being integrally covered by retroflective means comprising, conjointly, a reflective layer and a cooperating refractive cylinder means extending transversely of said strip in the space between said downwardly and upwardly inclining surfaces of successive wedges; said refractive cylinder means extending above the associated wedges so that light impinging on said one surface of each wedge is refracted by a cooperating cylinder means and returned by retroreflection in a direction substantially opposite to the incident direction, at least a portion of said refractive cylinder means being provided with transparent predetermined colored means for presenting a predetermined color to incident light refracted by said cylinder means.

2. A direction-indication surface marker as claimed in claim 1 and in which the other surface of each wedge presents through the refractive cylinder means a different color to incident light impinging on said other surface.

* * * * *